(12) United States Patent
Wu

(10) Patent No.: US 10,939,406 B1
(45) Date of Patent: Mar. 2, 2021

(54) ULTRA-WIDEBAND ASSISTED PRECISE POSITIONING METHOD

(71) Applicant: PSJ INTERNATIONAL LTD., Tortola (VG)

(72) Inventor: Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 0 days.

(21) Appl. No.: 17/002,897

(22) Filed: Aug. 26, 2020

(30) Foreign Application Priority Data

Mar. 27, 2020 (TW) .................................. 10911044.5

(51) Int. Cl.
*H04W 64/00* (2009.01)
*G01S 19/48* (2010.01)
*H04B 1/69* (2011.01)

(52) U.S. Cl.
CPC ............. *H04W 64/00* (2013.01); *G01S 19/48* (2013.01); *H04B 1/69* (2013.01)

(58) Field of Classification Search
CPC ...... H04B 3/36; H04B 17/309; H04B 17/318; H04B 1/69; H04W 88/08; H04W 24/02; H04W 4/021; H04W 4/029; H04W 16/20; H04W 4/025; H04W 4/80; H04W 84/12; H04W 92/20; H04W 24/04; H04W 4/02; H04W 4/023; H04W 4/024; H04W 4/027; H04W 4/33; H04W 4/38; H04W 4/90; H04W 64/003; H04W 64/006; H04W 64/00; G01S 5/0221; G01S 5/0226; G01S 5/0263; G01S 5/14; G01S 5/16; G01S 19/48

See application file for complete search history.

(56) References Cited

U.S. PATENT DOCUMENTS

| 7,403,783 B2 * | 7/2008 | Cheok ................... G01S 5/0284 455/456.1 |
| 2016/0357193 A1 * | 12/2016 | Bruemmer .............. G01S 19/14 |
| 2018/0160316 A1 * | 6/2018 | Byrne .................... G08B 25/10 |
| 2018/0321681 A1 * | 11/2018 | Tu ......................... G01C 21/005 |

* cited by examiner

*Primary Examiner* — Daniel Lai
(74) *Attorney, Agent, or Firm* — Li & Cai Intellectual Property (USA) Office

(57) ABSTRACT

An ultra-wideband assisted precise positioning method includes: arranging a plurality of base stations in a target area; configuring a mobile base station to move to a plurality of predetermined positions; configuring a GPS module to obtain GPS position information and GPS altitude information; configuring first ultra-wideband communication modules and a second ultra-wideband communication module to measure distance information; configuring a computing module to execute a first positioning algorithm to calculate a plurality of base station coordinates; arranging a third ultra-wideband communication module on an object to be measured; configuring the first ultra-wideband communication modules and the third ultra-wideband communication module to obtain detection distances; and configuring the computing module to execute a second positioning algorithm to calculate a positioning position of the object to be measured based on the detection distances and the plurality of base station coordinates.

10 Claims, 5 Drawing Sheets

ULTRA-WIDEBAND ASSISTED PRECISE POSITIONING METHOD

CROSS-REFERENCE TO RELATED PATENT APPLICATION

This application claims the benefit of priority to Taiwan Patent Application No. 109110445, filed on Mar. 27, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning method, and more particularly to an ultra-wideband assisted precise positioning method.

BACKGROUND OF THE DISCLOSURE

In existing positioning technology, GPS signals are mostly used as a medium to obtain position information.

When performing positioning in indoor spaces, due to limited GPS signals, WI-FI®, BLUETOOTH®, and 4G base stations are currently used to assist indoor GPS positioning; however, centimeter-level positioning cannot be achieved.

In addition, in some positioning systems, ultra-wideband signals are used to achieve centimeter-level positioning, by first obtaining a time difference between a base station and an object to be measured, and then obtains a position of the object to be measured through triangulation.

However, the positioning in this way requires manual measurement to obtain the coordinates of the base stations, which incurs a large amount of engineering cost and fails to meet mobility requirements, and it is also difficult to measure the coordinates of multiple base stations manually in a large indoor space.

Therefore, there is an urgent need for a positioning system that is fast and simple, and that can meet the needs of mobility and achieve precise positioning.

SUMMARY OF THE DISCLOSURE

In response to the above-referenced technical inadequacies, the present disclosure provides an ultra-wideband assisted precise positioning method.

In one aspect, the present disclosure provides an ultra-wideband assisted precise positioning method including: arranging a plurality of base stations in a target area, in which each of the plurality of base stations includes a first processing circuit, a first ultra-wideband communication module and a first wide area network communication module. The first ultra-wideband communication module is configured to receive and transmit ultra-wideband signals, and the first wide area network communication module is configured to connect to a wide area network. The method further includes providing a mobile base station, which includes a moving module, a second wide area network communication module, a second ultra-wideband communication module, a second processing circuit, and a global positioning system (GPS) module. The moving module is configured to provide mobile power output, and the second wide area network communication module is configured to communicate with the plurality of base stations through the wide area network. The second ultra-wideband communication module is configured to receive and transmit ultra-wideband signals. The second processing circuit is configured to control the moving module, and the GPS module is configured to obtain GPS position information and GPS altitude information of the mobile base station. The method further includes: configuring the second processing circuit to move the mobile base station to a plurality of predetermined positions in the target area, and performing the following steps in response to the mobile base station being located at each of the plurality of predetermined positions: configuring the GPS module to obtain the GPS position information and the GPS altitude information; configuring each of the plurality of first ultra-wideband communication modules and the second ultra-wideband communication module to measure distance information between each of the base stations and the mobile base station; configuring a server to obtain, through the wide area network, the distance information, the GPS position information, and the GPS altitude information obtained at the predetermined positions; configuring a computing module of the server to execute a first positioning algorithm to calculate a plurality of base station coordinates of the plurality of base stations; arranging a third ultra-wideband communication module on an object to be measured in the target area; configuring the plurality of first ultra-wideband communication modules to communicate with the third ultra-wideband communication module to obtain a plurality of detection distances between the object to be measured and the plurality of base stations, respectively; configuring the server to obtain the plurality of detection distances and the plurality of base station coordinates through the wide area network; and configuring the computing module to execute a second positioning algorithm to calculate a positioning position of the object to be measured based on the plurality of detection distances and the plurality of base station coordinates.

Therefore, the ultra-wideband assisted precise positioning method provided by the present disclosure can quickly obtain coordinates of the base stations by utilizing the mobility of the mobile base station, and can precisely obtain absolute coordinates of fixed ultra-wideband (UWB) base stations according to a flight path of dynamic unmanned aerial vehicle (UAV) and UWB distances. After the coordinates of the UWB base stations are obtained through the method, centimeter-level indoor positioning can be achieved, which is suitable for precise indoor positioning in a large indoor space.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
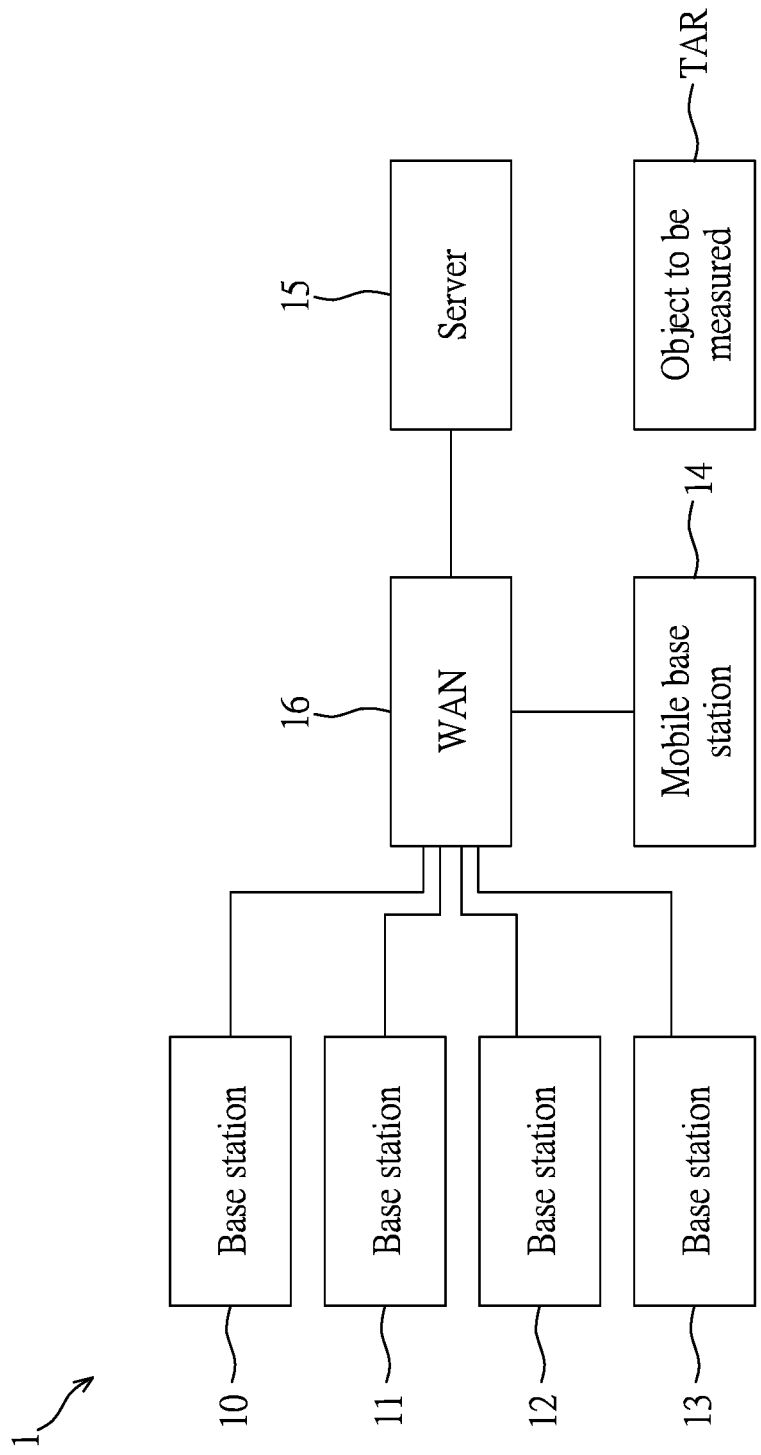
FIG. 1 is a block diagram of an ultra-wideband assisted precise positioning system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
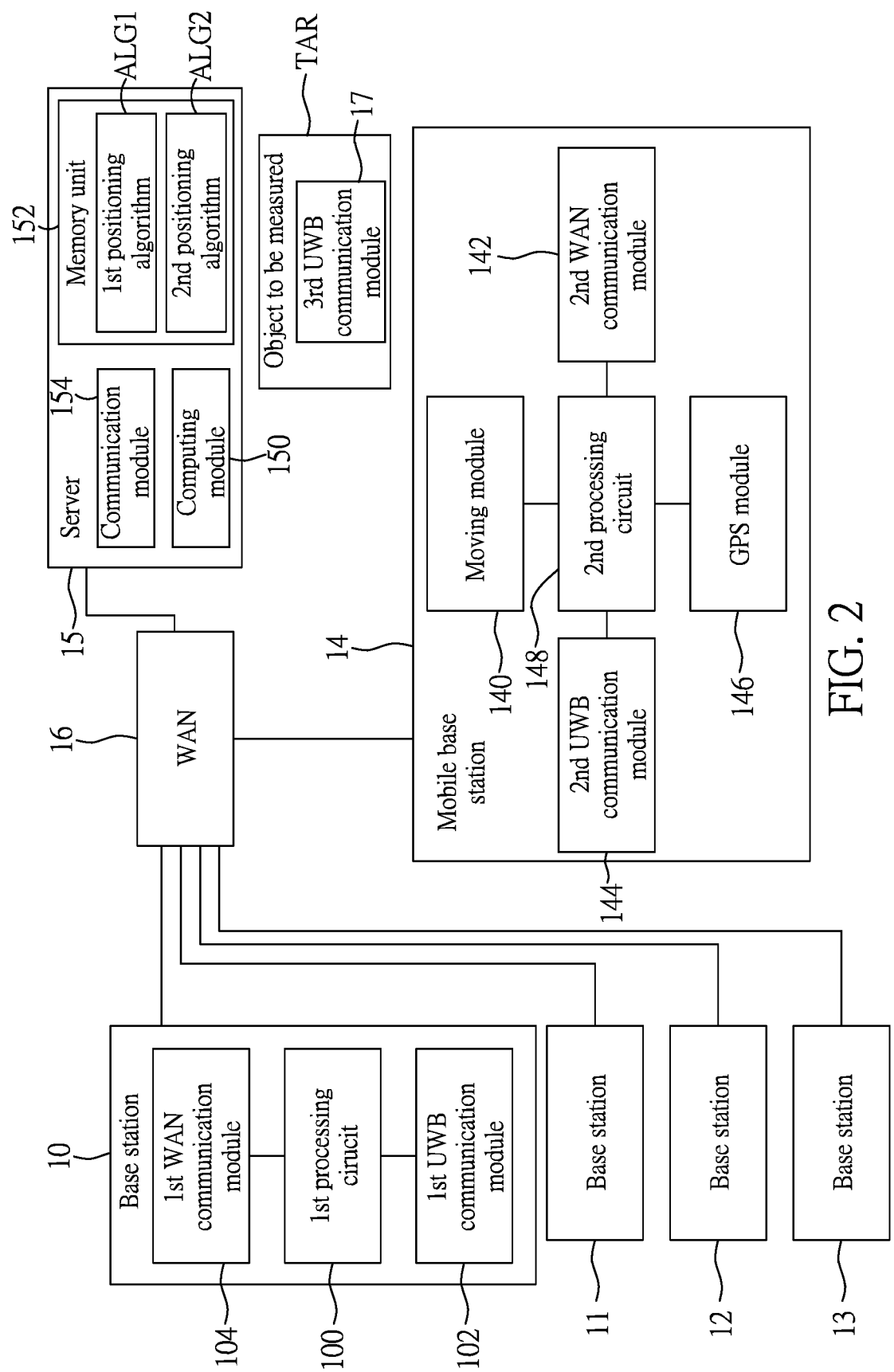
FIG. 2 is a block diagram of base stations and a mobile base station according to one embodiment of the present disclosure.
Figure 3:
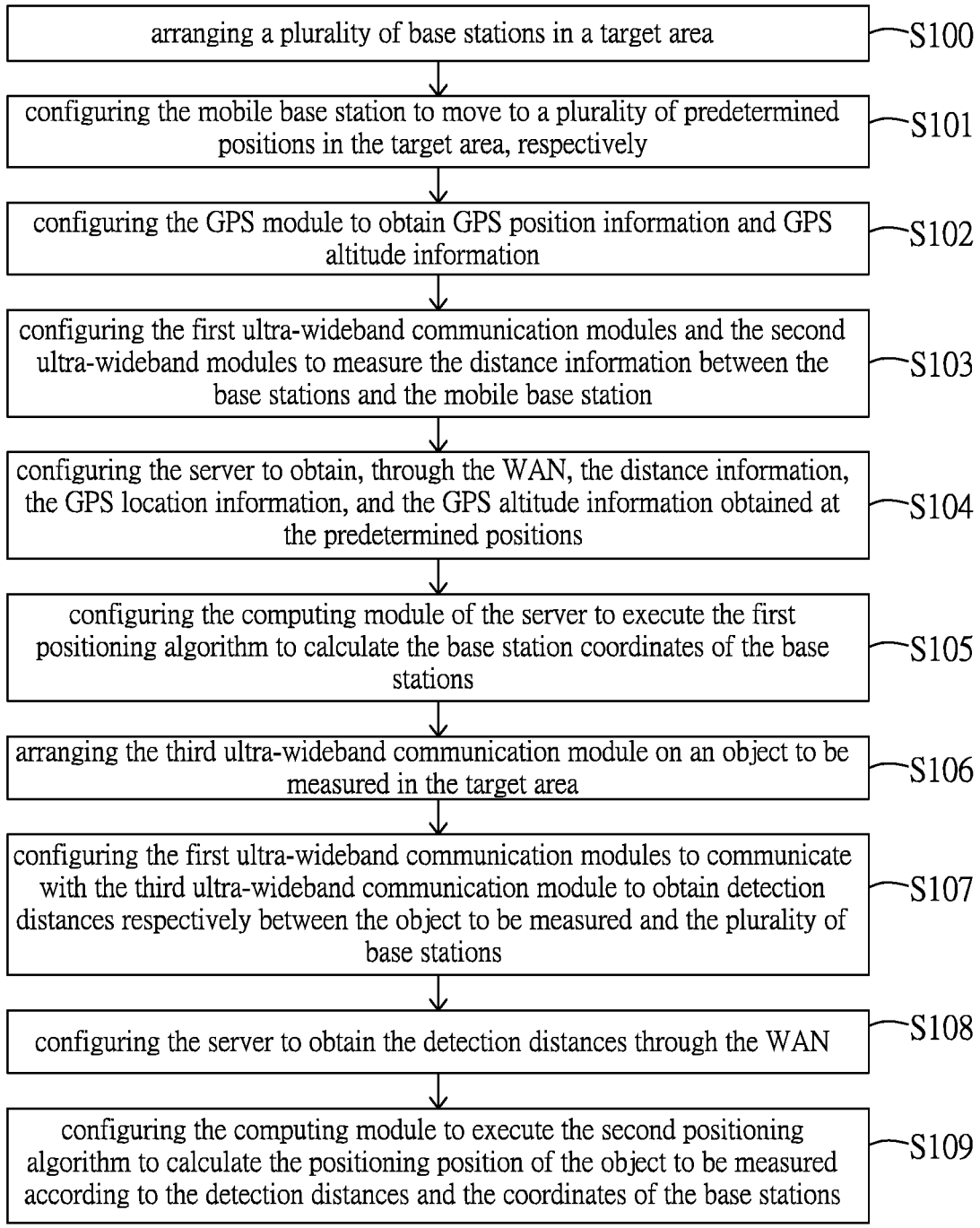
FIG. 3 is a flowchart of an ultra-wideband assisted precise positioning method according to one embodiment of the present disclosure.

Reference is made to FIGS. 1 to 3, FIG. 1 is a block diagram of an ultra-wideband assisted precise positioning system according to one embodiment of the present disclosure, FIG. 2 is a block diagram of base stations and a mobile base station according to one embodiment of the present disclosure, and FIG. 3 is a flowchart of an ultra-wideband assisted precise positioning method according to one embodiment of the present disclosure. As shown in FIGS. 1 to 3, before the ultra-wideband assisted precise positioning method of the present disclosure is explained, an ultra-wideband assisted precise positioning system 1 utilized by the present disclosure is first introduced. As shown in FIG. 1, the ultra-wideband assisted precise positioning system 1 includes a plurality of base stations 10, 11, 12 and 13, a mobile base station 14 and a server 15.

Each of the plurality of base stations 10, 11, 12, 13, for example, the base station 10, includes a first processing circuit 100, a first ultra-wideband communication module 102, and a first wide area network (WAN) communication module 104, and the base stations 11, 12, 13 and the base station 10 have the same configurations. In the present embodiment, the quantity of base stations 10, 11, 12, 13 is at least four.

The mobile base station 14 can include a moving module 140, a second wide area network (WAN) communication module 142, a second ultra-wideband communication module 144, a global positioning system (GPS) module 146, and a second processing circuit 148.

The second WAN communication module 142 is configured to communicate with the base stations through the wide area network (WAN) 16. The second processing circuit 148 is configured to control the moving module 140.

The mobile base station 14 can be installed on an unmanned aerial vehicle (UAV), which generally can be a variety of radio controlled aircrafts that do not require a human pilot. The mobile base station 14 has a moving module 140, such as a propeller controller, for providing mobile power output, and receiving external control signals to control the mobile base station 14 to move. In addition, the UAV can be combined with remotely controlled machine communication (MTC) components such as multi-axis gyroscopes, barometers/infrared ranging components, ultrasonic ranging components, cameras, and the like. In this embodiment, the moving module 140 is a flight power module configured to provide flight power output.

The first ultra-wideband communication module 102 and the second ultra-wideband communication module 144 are configured to send and receive ultra-wideband signals. In detail, ultra-wideband (UWB) is a wireless personal area network communication technology with low power consumption and high-speed transmission, and suitable for wireless communication applications requiring high-quality services. UWB can be used in fields such as wireless personal area networks (WPAN), home network connection and short-range radar, and UWB uses pulse signals to receive and transmit ultra-wideband signals.

The first processing circuit 100 and the second processing circuit 148 can include a microcontroller and a microprocessor. The first processing circuit 100 can be used to control the first WAN communication module 104 to connect to the WAN 16 and control the first ultra-wideband communication module 102 to transmit and receive ultra-wideband signals. The second processing circuit 148 can be used to control the moving module 140, the second WAN communication module 142, the second ultra-wideband communication module 144, and the GPS module 146.

The GPS module 146 is configured to obtain GPS position information and GPS altitude information of the mobile base station 14. It should be noted that the plurality of base stations of the present disclosure, for example, the base stations 10, 11, 12, 13 do not substantially need to be provided with GPS modules, but the present disclosure is not limited thereto.

The first WAN communication module 104 and the second WAN communication module 142 can be, for example, long range (LoRa) wide area network communication modules configured to connect to the WAN 16. In the present disclosure, long-distance transmission advantages of LoRa can be utilized to greatly expand the coverage distance and operating performance of the ultra-wideband assisted precise positioning system 1. In addition, the base stations 10, 11, 12, 13 and the mobile base station 14 can also communicate with one another through the WAN 16.

In addition, the server 15 may include a computing module 150, a memory unit 152, and a communication module 154. The communication module 154 is configured to connect to the WAN 16, the memory unit 152 stores a first positioning algorithm ALG1 and a second positioning algorithm ALG2, and the memory unit 152 can be, for example, a volatile memory or a non-volatile memory, and the computing module 150 can include a central processing unit for executing the first positioning algorithm ALG1 and the second positioning algorithm ALG2.

Figure 4:
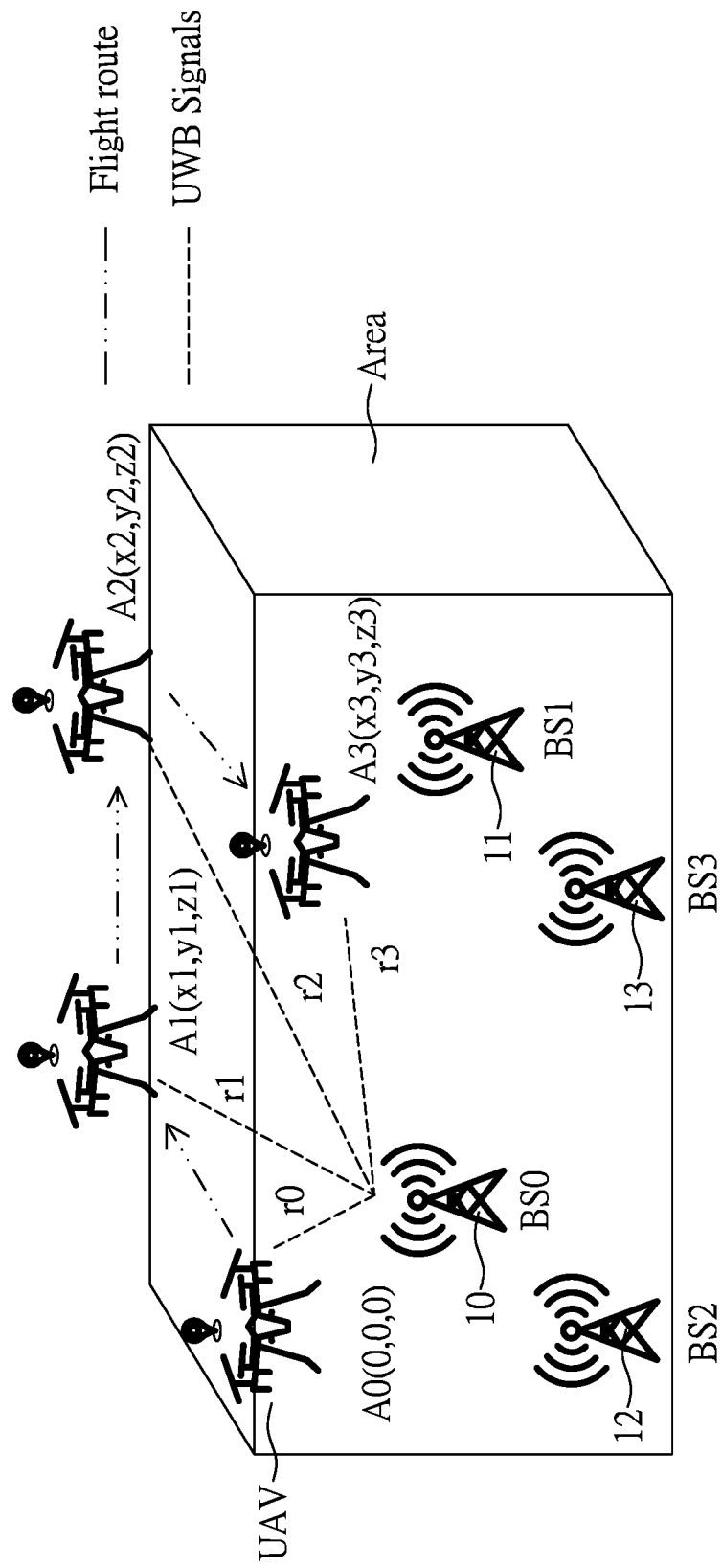
FIG. 4 is a schematic diagram showing a construction of an ultra-wideband assisted precise positioning system according to one embodiment of the present disclosure.

Reference is made to FIGS. 3 and 4, FIG. 3 is a flowchart of the ultra-wideband assisted precise positioning method according to one embodiment of the present disclosure, and FIG. 4 is a schematic diagram showing construction of the ultra-wideband assisted precise positioning system according to one embodiment of the present disclosure.

As shown FIGS. 3 and 4, the ultra-wideband assisted precise positioning method according to one embodiment of the present disclosure includes the following steps:

Step S100: arranging a plurality of base stations 10, 11, 12 and 13 in a target area Area. For example, four or more base stations can be placed indoors or outdoors.

Step S101: configuring the mobile base station 14 to move to a plurality of predetermined positions in the target area Area, respectively. For example, the mobile base station 14 can be installed on an unmanned aerial vehicle UAV, the server 15 can be configured to communicate with the mobile base station 14, and the server 15 can transmit a moving command signal to the mobile base station 14 according to a predetermined route stored in the memory unit 152.

In response to the mobile base station 14 receiving the moving command signal through the second WAN communication module 142, the second processing circuit 148 processes the moving command signal, and further controls the moving module 140 to output power so that the mobile base station 14 can move to the predetermined positions in the target area according to the predetermined route, such as predetermined positions A0, A1, A2, and A3 shown in FIG. 4, and stay for a predetermined time when arriving the predetermined positions.

In response to the mobile base station 14 staying at these predetermined positions, the following steps can be further performed:

Step S102: configuring the GPS module to obtain GPS position information and GPS altitude information.

Step S103: configuring the first ultra-wideband communication modules 102 and the second ultra-wideband communication modules 144 of the base stations 10, 11, 12, and 13 to measure the distance information between the base stations 10, 11, 12, and 13 and the mobile base station 14. For example, the unmanned aerial vehicle UAV can be controlled to fly outside the base stations 10, 11, 12, 13 and hover after flying for a certain period of time along a certain path. At the same time, the second ultra-wideband communication module 144 is configured to transmit UWB signals to the base stations 10, 11, 12, 13. GPS coordinates of the four positions and the corresponding multiple distances between the base stations 10, 11, 12, and 13 can be obtained after the UAV hovers for four times or more.

After the mobile base station 14 obtains the data at the predetermined positions A0, A1, A2, and A3, the method proceeds to step S104: configuring the server 15 to obtain, through the WAN 16, the distance information, for example, distance information r0, r1, r2 and r3, the GPS position information such as the coordinates of the predetermined positions A0, A1, A2, A3, and the GPS altitude information obtained at the predetermined positions A0, A1, A2, and A3. This step is used to collect the data acquired by the mobile base station 14 and prepare for calculation by the server 15. In some embodiments, the base stations 10, 11, 12, and 13 are located in an indoor space, and the predetermined positions A0, A1, A2, and A3 can be located in an outdoor space with respect to the indoor space. However, it should be noted that the predetermined positions A0, A1, A2, and A3 must be within the ranges that can respectively communicate with the base stations 10, 11, 12, and 13 to ensure that the distance information can be measured correctly.

Optionally, when the second processing circuit 148 of the mobile base station 14 or the first processing circuits 100 of the base stations 10, 11, 12, and 13 have sufficient computing power, the distance information, data collection and calculation for the GPS position information and the GPS altitude information can also be performed by the base station 14 and one of the base stations 10, 11, 12, and 13, and are not limited to be performed by the server 15.

Step S105: configuring the computing module 150 of the server 15 to execute the first positioning algorithm ALG1 to calculate a plurality of base station coordinates BS0, BS1, BS2 and BS3 of the base stations 10, 11, 12, and 13. In detail, when the mobile base station 14 stays at these predetermined positions, the GPS coordinates of the four positions and the distances corresponding to the base stations 10, 11, 12, and 13 are obtained, and a least squares technique (four-sided positioning) can be further used to obtain absolute position coordinates of each of the base stations 10, 11, 12, and 13.

For example, the first positioning algorithm ALG1 can include the least squares technique, which can be calculated by the following equation (1):

$$\vec{BS_0} = \left(\vec{A}^T \vec{A}\right)^{-1} \vec{A}^T \vec{b} \ ; \qquad \text{equation (1)}$$

$$\text{where } \vec{A} = \begin{bmatrix} x1 & y1 & z1 \\ x2 & y2 & z2 \\ x3 & y3 & z3 \end{bmatrix}_{3\times3},$$

which mainly uses the predetermined position A0 as an original point, and calculates relative coordinates of the predetermined positions A1, A2, and A3 based on the obtained GPS position information and the obtained GPS altitude information.

$$\text{Where } \vec{b} = \frac{1}{2}\begin{bmatrix} x1^2 + y1^2 + z1^2 - r1^2 + r0^2 \\ x2^2 + y2^2 + z2^2 - r2^2 + r0^2 \\ x3^2 + y3^2 + z3^2 - r3^2 + r0^2 \end{bmatrix}_{3\times1},$$

and distances and relative coordinates of the base station 14 and the base station 10 obtained at the four predetermined positions A0, A1, A2, A3 are substituted in the above equation. $\vec{A}$ and $\vec{b}$ are substituted into the equation (1), and then the base station coordinates BS0, BS1, BS2 and BS3 can be obtained.

In this way, the positioning system is established.

Step S106: arranging the third ultra-wideband communication module 17 on an object to be measured TAR in the target area.

Step S107: configuring the first ultra-wideband communication modules of the base stations 10, 11, 12, and 13 to communicate with the third ultra-wideband communication module 17 to obtain detection distances respectively between the object to be measured TAR and the plurality of base stations 10, 11, 12, and 13.

Step S108: configuring the server 15 to obtain the detection distances through the WAN 16.

Step S109: configuring the computing module 150 to execute the second positioning algorithm ALG2 to calculate the positioning position of the object to be measured TAR according to the detection distances and the coordinates of the base stations 10, 11, 12, and 13.

In detail, after the coordinates of four (or more) base stations 10, 11, 12, and 13 are arranged arbitrarily indoor/outdoor, the first ultra-wideband communication modules 102 of the base stations 10, 11, 12, and 13 transmit UWB signal to the third ultra-wideband communication module 17, the distances are then measured to obtain the distances to the object to be measured TAR, and the second positioning algorithm ALG2 is utilized, for example, the least squares technique, to obtain the position of the object to be measured TAR.

Figure 5A:
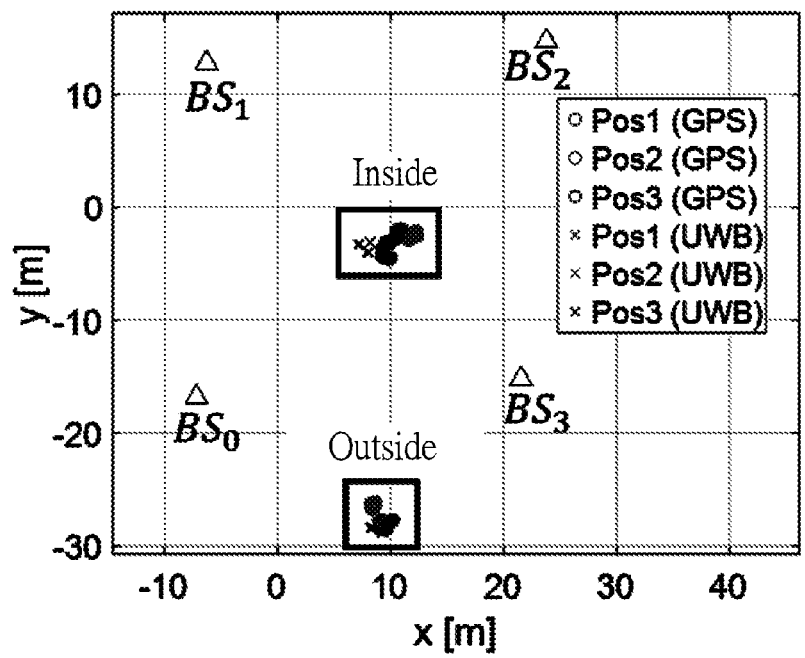
FIG. 5A is a position distribution diagram of positioning an object to be measured by the ultra-wideband assisted precise positioning method and a conventional GPS positioning system according to one embodiment of the present disclosure.
Figure 5B:
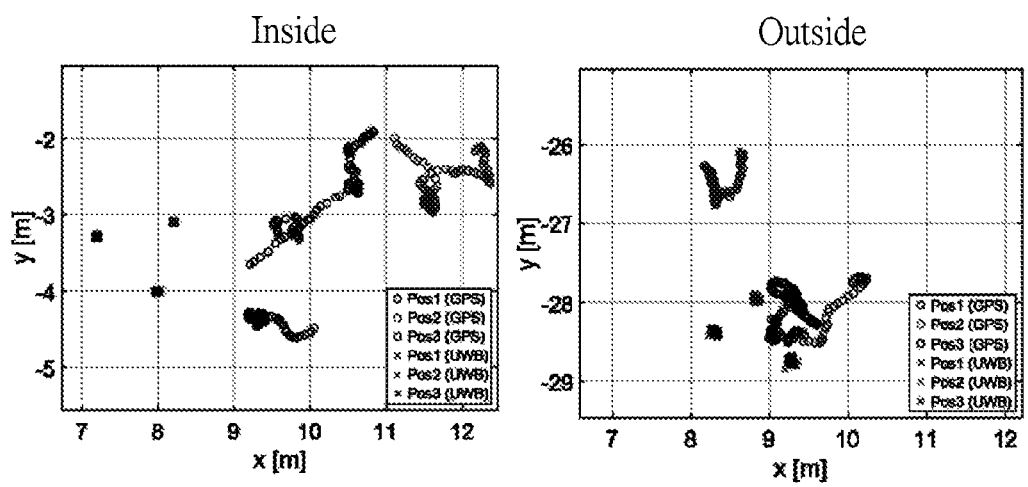
FIG. 5B is a partially enlarged view of FIG. 5A.

Reference is made to FIGS. 5A and 5B, FIG. 5A is a position distribution diagram of positioning an object to be measured by the ultra-wideband assisted precise positioning method and the existing GPS positioning system according to one embodiment of the present disclosure, and FIG. 5B is a partially enlarged view of FIG. 5A.

As shown in FIGS. 5A and 5B, objects $BS_0$, $BS_1$, $BS_2$, and $BS_3$ represent the coordinates of the base stations 10, 11, 12, and 13, respectively, which are obtained by substituting the GPS position information obtained by the mobile base station 14 at four predetermined positions and the relative distances between the mobile base station 14 and each of the base stations 10, 11, 12, and 13 into the least squares technique. Three objects to be measured are respectively arranged within and outside an area formed by the base stations 10, 11, 12, and 13, and positioning results Pos1 (UWB), Pos2 (UWB), Pos3 (UWB) generated by the ultra-wideband assisted precise positioning method of the present disclosure and positioning results Pos1 (GPS), Pos2 (GPS), Pos3 (GPS) generated by the existing GPS positioning are shown in FIGS. 5A and 5B.

Reference is further made to Table 1 below, which is a comparison of GPS and UWB relative position errors. It can be clearly seen from FIG. 5B that the positioning results generated by the existing GPS positioning can no longer accurately identify the relative positions of the base stations, while the ultra-wideband assisted precise positioning method of the present disclosure can still accurately identify the relative positional relationship of the three objects to be measured, and the positioning accuracy is about 0.10 m. The positioning accuracy is higher inside the area formed by the base stations 10, 11, 12, and 13, and slightly lower outside the area. The positioning accuracy of the positioning results generated by the existing GPS positioning is about 1 to 2 m, so that it can be known that the ultra-wideband assisted precise positioning method of the present disclosure can improve the accuracy by an order of magnitude. In other words, in addition to verifying the feasibility of the ultra-wideband assisted precise positioning method provided by the present disclosure, the above results also show that the positioning system established by the mobile base station 14 quickly acquiring the coordinates of the base stations 10, 11, 12, 13 can have a positioning result achieving a 10 cm-level positioning accuracy.

TABLE 1

| Item | Relative position errors |
|---|---|
| GPS | 1.12 m |
| UWB (inside) | 0.05 m |
| UWB (outside) | 0.15 m |

Therefore, the present disclosure can quickly obtain coordinates of the base stations by utilizing the mobility of the mobile base station, and can precisely obtain absolute coordinates of fixed UWB base stations according to a flight path of dynamic UAV and UWB distances. After the coordinates of the UWB base stations are obtained through the method, centimeter-level indoor positioning can be achieved, which is suitable for precise indoor positioning in large indoor spaces.

In another embodiment, when the server 15 transmits the moving command signal to the mobile base station 14 according to the predetermined route, the plurality of predetermined positions in the predetermined route can be set to have predetermined distances from one another, and the predetermined positions form a predetermined pattern.

After the mobile base station 14 stays at four predetermined positions and obtains the GPS position information and the GPS altitude information, the server 15 obtains the data and executes a pattern search algorithm to correct the GPS position information and the GPS altitude information to generate a plurality of corrected position information and a plurality of corrected altitude information.

Next, a total error is calculated using the cost function, which includes the distance error and the position error, which is expressed by the following equation (2):

$$\alpha \times \sum_{i=0}^{2} \sum_{j=i+1}^{3} |(|\vec{x_i} - \vec{x_j}|^2 - D_{ij}^2)| + \sum_{i=0}^{3} |\vec{x_i} - \tilde{x}_i|^2; \quad \text{equation (2)}$$

where $\alpha$ is an empirical weight value, $\vec{x_i}$ includes the corrected position information and the corrected altitude information, $D_{ij}^2$ is a predetermined distance, $\tilde{x}_1$ is an initial position and initial altitude generated by the global satellite positioning module 146, and $\vec{x_j}$ is a predicted position and a predicted altitude. Therefore, the distance errors are errors between a plurality of relative distances and the predetermined distances, in which the relative distances are distances between the predicted positions and the corrected positions, and the position errors are errors between the predicted positions and the corrected positions. The empirical weight value a is adjusted and compared with a real position on the ground, such that the empirical weight value a with the smallest error can be found.

In conclusion, the ultra-wideband assisted precise positioning method provided by the present disclosure can quickly obtain coordinates of the base stations by utilizing the mobility of the mobile base station, and can precisely obtain an absolute coordinates of fixed UWB base stations according to a flight path of dynamic UAV and UWB distances. After the coordinates of the UWB base stations are obtained through the method, centimeter-level indoor positioning can be achieved, which is suitable for precise indoor positioning in large indoor spaces.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ultra-wideband assisted precise positioning method, comprising:
arranging a plurality of base stations in a target area, wherein each of the plurality of base stations includes:
a first processing circuit;
a first ultra-wideband communication module configured to receive and transmit ultra-wideband signals; and
a first wide area network communication module configured to connect to a wide area network;
providing a mobile base station, wherein the mobile base station includes:
a moving module configured to provide mobile power output;
a second wide area network communication module configured to communicate with the plurality of base stations through the wide area network;
a second ultra-wideband communication module configured to receive and transmit ultra-wideband signals; and
a second processing circuit configured to control the moving module; and
a global positioning system (GPS) module configured to obtain GPS position information and GPS altitude information of the mobile base station;
configuring the second processing circuit to move the mobile base station to a plurality of predetermined positions in the target area, and performing the following steps in response to the mobile base station being located at each of the plurality of predetermined positions:
configuring the GPS module to obtain the GPS position information and the GPS altitude information; and
configuring each of the plurality of first ultra-wideband communication modules and the second ultra-wideband communication module to measure distance information between each of the base stations and the mobile base station;
configuring a server to obtain, through the wide area network, the distance information, the GPS position information, and the GPS altitude information obtained at the predetermined positions;
configuring a computing module of the server to execute a first positioning algorithm to calculate a plurality of base station coordinates of the plurality of base stations;
arranging a third ultra-wideband communication module on an object to be measured in the target area;
configuring the plurality of first ultra-wideband communication modules to communicate with the third ultra-wideband communication module to obtain detection distances respectively between the object to be measured and the plurality of base stations;
configuring the server to obtain the plurality of detection distances and the plurality of base station coordinates through the wide area network; and
configuring the computing module to execute a second positioning algorithm to calculate a positioning position of the object to be measured based on the plurality of detection distances and the plurality of base station coordinates.

2. The ultra-wideband assisted precise positioning method according to claim 1, wherein a quantity of the plurality of base stations is at least four.

3. The ultra-wideband assisted precise positioning method according to claim 2, wherein a number of the plurality of predetermined positions is at least four.

4. The ultra-wideband assisted precise positioning method according to claim 2, wherein the plurality of base stations are located in an indoor space.

5. The ultra-wideband assisted precise positioning method according to claim 2, wherein the plurality of predetermined positions are located in an outdoor space with respect to an indoor space.

6. The ultra-wideband assisted precise positioning method according to claim 1, wherein the first positioning algorithm and the second positioning algorithm include a least squares technique.

7. The ultra-wideband assisted precise positioning method according to claim 1, further comprising:
configuring the server to communicate with the mobile base station;
configuring the server to transmit a motion command signal to the mobile base station according to a predetermined route; and
configuring the second processing circuit of the mobile base station to move the mobile base station to the predetermined positions in the target area according to the predetermined route, wherein the mobile base station stays at each of the predetermined positions for a predetermined time after arriving thereat.

8. The ultra-wideband assisted precise positioning method according to claim 1, wherein the first wide area network communication module and the second wide area network communication module each includes a long range (LoRa) wide area network communication module.

9. The ultra-wideband assisted precise positioning method according to claim 1, wherein the mobile base station is arranged on an unmanned aerial vehicle, and the moving module is a flight power module configured to provide flight power output.

10. The ultra-wideband assisted precise positioning method according to claim 1, further comprising:
setting the plurality of predetermined positions to have a predetermined distance from one another, wherein the plurality of predetermined positions form a predetermined pattern;
configuring the server to execute, according to the predetermined pattern, the predetermined distance, the GPS position information and the GPS altitude information, a pattern search algorithm to correct the initial positions to generate a plurality of corrected positions;
generating a plurality of predicted positions and a plurality of predicted altitudes to be input to a cost function for finding a plurality of final predicted positions and a plurality of final predicted altitudes with relatively minimum errors, wherein the cost function includes an empirical weight value associated with a relative distance error and a relative altitude error;

configuring the server to obtain, through the wide area network, the distance information, the GPS position information, and the GPS altitude information; and
configuring the computing module of the server to execute the first positioning algorithm to calculate the plurality of base station coordinates of the plurality of base stations.

* * * * *